United States Patent Office 3,293,211
Patented Dec. 20, 1966

3,293,211
PROCESS FOR THE PRODUCTION OF HIGH MOLECULAR WEIGHT LINEAR ORGANO-SILICIC ACID ARYLENE POLYESTERS
Heinrich Krimm, Krefeld-Bockum, and Hermann Schnell, Krefeld-Urdingen, Germany, assignors to Farbenfabriken Bayer Aktiengesellschaft, Leverkusen, Germany, a German corporation
No Drawing. Filed July 11, 1961, Ser. No. 123,130
Claims priority, application Germany, July 16, 1960,
F 31,682, F 31,683
6 Claims. (Cl. 260—47)

The present invention is concerned with a process for the production of high molecular weight, linear organo-silicic acid arylene polyesters.

It is known (German Patent No. 1,082,057) to produce high molecular weight organo-silicic acid arylene polyesters of the general formula:

I 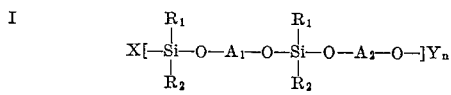

wherein $A_1$ and $A_2$ denote arylene radicals, $R_1$ and $R_2$ denote methyl, ethyl or phenyl radicals, X denotes halogen or the methoxy, ethoxy or phenoxy radical or the radical, —O—$R_1$—OH or —O—$R_2$—OH, Y denotes hydrogen or a halogen-, methoxy-, ethoxy-, or phenoxy-dimethyl-, -diethyl-, -methylethyl-, -diphenyl-, -methylphenyl- or -ethylphenyl-silane radical, and $n$ denotes a whole number greater than 3, by reacting aromatic dihydroxy compounds with equivalent amounts of dihalogen-, dimethoxy-, diethoxy-, methoxyethoxy-, diphenoxy-, methoxyphenoxy or ethoxyphenoxy-dimethyl-, -diethyl-, -methylethyl-, -diphenyl-, -methylphenyl- or -ethylphenyl silanes, operating, if dihalosilanes are used, at room temperature in the presence of organic hydrogen halide-binding agents and optionally of solvents, but, if dialkoxy or diaroxy silanes are used, at temperatures between about 150 and about 450° C. under reduced pressure, optionally in the presence of basic transesterification catalysts containing alkali or alkaline earth metals, in amounts of at most about 0.005 percent (calculated upon the metal of the catalyst).

We have now found that high molecular weight, linear organo-silicic acid arylene polyesters of the aforesaid type with improved properties, possibly, in particular, with higher molecular weights, can be produced by heating linear organo-silicic acid arylene polyesters of the afore-mentioned type, preferably in the presence of transesterification catalysts, simultaneously distilling off the macrocyclic organo-silicic acid arylene esters thus formed and having the general formula:

II 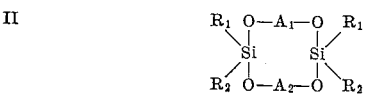

in which $A_1$, $A_2$, $R_1$ and $R_2$ have the same meaning as above, from the reaction mixture under reduced pressure and reheating these macrocyclic organo-silicic acid arylene esters, optionally after recrystallization and preferably in the presence of transesterification catalysts, by normal pressure, thus reforming, under splitting cyclic ester II, high molecular weight linear organo-silicic acid arylene polyesters of the general formula:

III 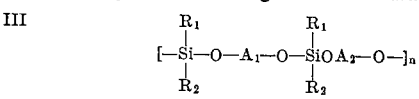

wherein $A_1$, $A_2$, $R_1$, $R_2$ and $n$ have the same significance as in Formula I.

While for the high molecular weight organo-silicic acid arylene polyesters of the Formula I which are starting materials for the present process the end groups X and Y may be named as these end groups, depending upon the reaction components of which these polyesters are produced and upon their proportions, the end groups of the process according to the invention are not definite and therefore cannot be given in Formula III since these polyesters are formed by splitting cyclic compounds and it is unknown by which atoms or groups the high molecular chains are terminated.

The linear polyesters from which the process starts may be obtained, for example, from: hydroquinone, 4,4'-dihydroxy-diphenyl, 1,4-dihydroxynaphthalene, 4,4'-dihydroxy-diphenyl-methane, 1,1 - (4,4' - dihydroxy-diphenyl)-ethane, 1,2 - (4,4'-dihydroxy-diphenyl)-ethane, 1,1 - (4,4' - dihydroxy-diphenyl)-propane, 2,2-(4,4'-dihydroxy-diphenyl)-propane, 1,1 - (4,4' - dihydroxy - diphenyl)-butane, 2,2-(4,4' - dihydroxy-diphenyl)-pentane, 3,3-(4,4' - dihydroxy - diphenyl) - pentane, 2,2-(4,4'-dihydroxy-3,3'-dimethyl-diphenyl)-propane, 1,1 - (4,4'-dihydroxy-diphenyl)-cyclohexane, 4,4'-dihydroxy-triphenyl-methane, 1,1,1-(4,4'-dihydroxy-triphenyl)-ethane, 4,4'-dihydroxy-diphenyl-ether, 4,4' - dihydroxy-diphenyl-sulphide, 4,4'-dihydroxy - diphenyl - sulphoxide, 4,4'-dihydroxy-diphenyl-sulphone and 4,4' - dihydroxybenzophenone, and from bifunctional organic silicon compounds, such as dichloro-dimethyl-silane, dibromo-dimethyl-silane, dichloro-diethyl-silane, dichloro - diphenyl-silane, dimethoxy-dimethyl-silane, diethoxy-dimethyl-silane, diphenoxy-dimethyl-silane, diethoxy - diphenyl - silane, diphenoxy-diphenyl-silane, dichloro-methyl-ethyl-silane, dichloro-methyl-phenyl-silane, diethoxy - methyl - ethyl - silane, diethoxy-methyl - phenyl - silane and diphenoxy-methyl-ethyl-silane.

The splitting off of the macrocyclic organo-silicic acid arylene esters from the linear organo-silicic acid arylene polyesters according to the invention is generally attained by heating to temperatures between about 250 and about 450° C. without transesterification catalysts being required. In general, however, it is advantageous to add catalytic amounts of transesterification catalysts, since the transformation of the linear polyesters into the cyclic esters is thus accelerated. Examples of catalysts which may be used, for this purpose are toluene sulphonic acid, zinc chloride, mercury chloride, lead oxide, zinc oxide, lead acetate, magnesium stearate and zinc stearate, as well as bleaching earths or cation exchangers and alkali or alkaline earth metals, oxides, hydroxides, hydrides, alcoholates, phenolates, carbonates and alkylcarboxylates.

Although the viscosity of the melt of the linear polyesters substantially increases during the course of the reaction, it is possible, as a rule, to convert the reaction product, with the exception of slight residues, without decomposition into the new cyclic esters. The distillates solidify in the receiver and form, in general, high-melting crystalline masses which may readily be obtained in high purity by recrystallization.

The macrocyclic organo-silicic acid arylene esters are colourless and have a high melting point and considerable chemical and physical resistance. They may be used, if desired, as plasticizers and modifying agents for plastics, such as polyesters and polyamides.

The temperature required for the subsequent polymerization of the macrocyclic organo-silicic acid esters may depend upon the type of the catalyst and lie between about 150 and 300° C. In the absence of catalysts, temperatures of about 250 and 400° C. are generally necessary.

If high polymerization temperatures are required, it is advisable to introduce an inert protective gas in order to avoid superficial discoloration.

As transesterification catalysts there may again be used, for example, toluene-sulphonic acids, zinc chloride, mercury chloride, lead oxide, zinc oxide, lead acetate, magnesium stearate, zinc stearate and lead naphthenate, as well as bleaching earths or cation exchangers and the alkali or alkaline earth metals, oxides, hydroxides, hydrides, alcoholates, phenolates, carbonates or alkyl carboxylates.

Whereas the known process for the production of high molecular weight organo-silicic acid polyesters is based on a polycondensation reaction, whereby an alcohol, phenol or hydrohalide is split off and the condensation proceeds only to that degree in which the product of cleavage is removed from the equilibrium, i.e., as a rule only to limited high condensation degrees (the relative viscosity of those polyesters scarcely exceeds 1.5) the second step of the present process is concerned with a polymerization process, the uniform starting product of which is present in a high state of purity, which permits almost any desired degree of polymerization to be achieved. The relative viscosity of the products may reach 4.0 and more.

Moreover, any predeterminable and desired polymerization degree may be determined by methods known as such. Thus, for example, it is possible to influence, to a large extent, chain length and distribution function of the polymeric units by the type and quantity of the catalyst or by the choice of the temperature range and the duration of the polymerization process. Furthermore, the simultaneous use of chain interrupters enables the degree of polymerization to be adjusted as desired. As chain interrupters there may be used for example, high-boiling compounds of the aliphatic or aromatic series with one or more hydroxyl groups, such as 2-ethyl-hexanol, hexane-1,6-diol, trimethylol-ethane, -propane or -butane, phenol, but especially substituted phenols, such as ethyl-phenol and tertiary butyl-phenol, as well as mono- or polyfunctional silicon compounds, such as phenoxy-trimethyl-silane and diphenoxy-dimethyl-silane.

It is, therefore, possible to produce, in a very simple manner and within considerably shorter periods of time, faultless, almost colourless, block polymerizates or coatings of any desired thickness with optimum properties.

Furthermore, the organo-silicic acid polyesters may be used as adhesives, cements and binding agents, as well as coatings and/or moldings. Solubilizers, dyestuffs, pigments, fillers and biologically-active substances may readily be incorporated, if desired.

The polyesters obtainable according to the process described above are distinguished by an extremely good resistance to temperature. In general, they can be heated for a short time, without difficulty, up to about 500° C.

The following examples are given for the purpose of illustrating the present invention:

*Example 1*

182.5 grams 2,2 - (4,4' - dihydroxy - diphenyl)-propane, 195.2 grams diphenoxy-dimethyl-silane and 200 milligrams of the sodium salt of 2,2-(4,4'-dihydroxy-diphenyl)-propane are slowly heated from 150 to 300° C./70 mm. Hg in a sausage flask, while phenol distils off. The residual phenol is removed by heating at 300° C./20 mm. Hg for a half hour. The viscous residue is then heated to temperatures between 340–360° C./0.1 mm. Hg and the reaction product remaining in the flask as a colorless mass which solidifies immediately in crystalline form is distilled off. 215 grams crystals are obtained. Yield 94.6% of the theoretical, melting point 219° C. (from toluene).

$C_{34}H_{40}O_4Si_2$ (molecular weight 568.7). Calculated: C=71.80%; H=7.09%. Found: C=71.59%; H=7.12%. Molecular weight (cryoscopic) 552, 556.

30 grams of the cyclic organo-silicic acid arylene ester thus obtained are mixed with 5 milligrams zinc stearate and heated to 300° C. for ½ hour, while passing over nitrogen. After cooling, a completely colourless, clear polymer is obtained which is viscous and elastic at room temperature. The relative viscosity, measured in methylene chloride, is 2.52. The softening interval lies at 160–175° C. The product can be heated to about 500° C. for a short time without decomposition.

10 grams of the cyclic organo-silicic acid arylene ester are heated to 400° C. for 5 minutes without any addition. The liquid melt which is initially of low viscosity, then becomes highly viscous. A colourless, clear polymer is likewise obtained having a relative viscosity of 2.11.

*Example 2*

40.0 grams 4,4' - dihydroxy - diphenyl - methane, 48.8 grams diphenoxy-dimethyl silane and 30 milligrams of the sodium salt of 4,4'-dihydroxy-diphenyl-methane are slowly heated to 300° C./50 mm. Hg, whilst the bulk of phenol distils off. The residue is removed by heating at 300° C./18 mm. Hg for a half hour. Upon further heating at 300–350° C. at oil pump vacuum, 41 grams of the reaction product, which immediately solidifies in crystalline form, distil over into the receiver at a pressure of 0.15 mm. Hg. Yield: 80% of the theoretical, melting point 220–221° C. (from toluene).

$C_{30}H_{32}O_4Si_2$ (molecular weight 512.6). Calculated: C=70.29%; H=6.29.%. Found: C=70.11%; H=6.17%. Molecular weight (cryoscopic) 505, 507.

5 grams of the cyclic organo-silicic acid arylene ester thus obtained are mixed with 1 milligram of the potassium salt of 4,4'-dihydroxy-diphenyl-methane and heated to 300° C. for 20 minutes. An entirely colourless polymer is obtained which is viscous and elastic at room temperature and has a softening point of 135–150° C. and a relative viscosity of 1.92 measured in methylene chloride.

*Example 3*

48.4 grams 2,2-(4,4'-dihydroxy-diphenyl)-butane, 48.8 grams diphenoxy-dimethyl-silane and 10 milligrams lead acetate are slowly heated up to 300° C./50 mm. Hg, while the bulk of the phenol distils off. The residual phenol is removed by heating to 300° C./18 mm. Hg for a half hour.

The temperature is then maintained between 360 and 400° C./0.2 mm. Hg, and the reaction product distilled over into the receiver where it solidifies in crystalline form. Yield: 54 grams (90.6% of the theoretical), melting point 165–166° C. (from toluene/acetone).

$C_{36}H_{44}O_4Si_2$ (molecular weight 596.7). Calculated: C=72.45%; H=7.43%. Found: C=72.20%; H=7.50%. Molecular weight (cryoscopic) 575, 579.

8 grams of the cyclic organo-silicic acid arylene ester thus obtained are mixed with 1 milligram lead naphthenate and heated to 250° C. for a half hour while passing over nitrogen. A colourless polymer which is viscous and elastic at room temperature and has a softening interval of 160–180° C. and a relative viscosity of 2.68, measured in methylene chloride, is obtained. The temperature resistance is the same as indicated in Example 1.

*Example 4*

53.6 grams 1,1-(4,4'-dihydroxy-diphenyl)-cyclohexane, 48.8 grams diphenoxy-dimethyl-silane and 10 milligrams powdered potassium hydroxide are slowly heated to 250° C./50 mm. Hg, while the bulk of the phenol distils off. By heating at 250–300° C./15 mm. Hg, the splitting off of phenol is completed.

Upon further heating at 360–400° C. at oil pump vacuum, 51 grams of a distillate, solidifying in crystalline form, are collected in the receiver at 0.15 mm. Hg. Yield: 78.5% of the theoretical, melting point 265–266° C. (from toluene/acetone).

$C_{40}H_{48}O_4Si_2$ (molecular weight 648.8). Calculated: C=74.04%; H=7.46%. Found: C=73.88%; H=7.51%. Molecular weight (cryoscopic) 625, 630.

5 grams of the cyclic organo-silicic acid arylene ester thus obtained are mixed with 1 milligram sodium p-cyclohexyl phenolate and heated at 300° C. for 10 minutes. A colourless polymer, which is viscous and elastic at room temperature and has a softening interval of 130–145° C. and a relative viscosity of 1.72, measured in methylene chloride, is thus obtained. The temperature resistance is the same as that indicated in Example 1.

*Example 5*

58.0 grams 1,1,1 - (4,4' - dihydroxy - triphenyl)-ethane, 48.8 grams diphenoxy-dimethyl-silane and 20 milligrams potassium carbonate are slowly heated to 300° C./50 mm. Hg, while simultaneously the bulk of phenol distils off. After heating at 300° C./18 mm. Hg, for a half hour, the splitting off of the phenol is completed.

The reaction product is then distilled from the viscous melt, at an internal temperature of 380–420° C., into the receiver where it solidifies in crystalline form. Yield: 42 grams (61% of the theoretical), melting point 293–294° C. (from toluene).

$C_{44}H_{44}O_4Si_2$ (molecular weight 692.8). Calculated: C=76.27%; H=6.40%. Found: C=76.27%; H=6.50%. Molecular weight (cryoscopic) 659, 665.

5 grams of the cyclic organo-silicic acid arylene ester thus obtained are heated to 280° C. for 10 minutes with 1 milligram magnesium stearate, while passing over nitrogen. A colourless, clear polymer, which is viscous and elastic at room temperature and has a softening interval of 155–170° C. and a relative viscosity of 1.90, is obtained. The temperature resistance is the same as that indicated in Example 1.

We claim:

1. A process for the production of high molecular weight linear organo-silicic acid arylene polyesters which comprises (1) heating at temperatures from about 300 to about 450° C. under reduced pressure, a high molecular weight linear polyester of the general formula:

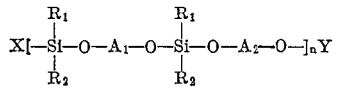

wherein $A_1$ and $A_2$ denote arylene radicals, $R_1$ and $R_2$ denote members of the group consisting of methyl, ethyl and phenyl radicals, $n$ denotes a whole number greater than 3, X denotes a member of the group consisting of a halogen atom, methoxy, ethoxy, phenoxy, —O—$R_1$—OH and —O—$R_2$—OH, and Y denotes a member of the group consisting of hydrogen, a halogen-, methoxy-, ethoxy-, phenoxy-, dimethyl-, diethyl-, methylethyl-, diphenyl-, -methylphenyl-, and -ethylphenyl-silane radical, (2) distilling off from the reaction mixture the thus formed macrocyclic organo-silicic acid arylene esters of the general formula:

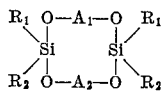

wherein $A_1$, $A_2$, $R_1$ and $R_2$ have the same significance as above, and (3) reheating said macrocyclic silicic acid arylene esters at temperatures from about 150° to about 400° C., thus reforming, by splitting the cyclic ester chain, a high molecular weight linear organo-silicic acid arylene polyester.

2. The process of claim 1 wherein the heating of the linear polyester is carried out in the presence of a transesterification catalyst.

3. The process of claim 1 wherein the macrocyclic ester is heated to a temperature between about 250° to about 400° C.

4. The process of claim 1 wherein the heating of the macrocyclic ester is carried out in the presence of a transesterification catalyst.

5. The process of claim 1 wherein the macrocyclic ester is heated to a temperature between about 150° to about 300° C. in the presence of a transesterification catalyst.

6. The process of claim 1 wherein the heating of the macrocyclic ester is carried out in the presence of a chain interrupter.

References Cited by the Examiner

UNITED STATES PATENTS 2,386,793  10/1945  Hanford _____ 260—448.8

SAMUEL H. BLECH, *Primary Examiner.*

HAROLD BURSTEIN, WILLIAM H. SHORT,
*Examiners.*

W. G. GOODSON, J. C. MARTIN,
*Assistant Examiners.*